United States Patent
Boney et al.

(10) Patent No.: US 6,989,125 B2
(45) Date of Patent: Jan. 24, 2006

(54) PROCESS OF MAKING A NONWOVEN WEB

(75) Inventors: Lee Cullen Boney, Gainesville, FL (US); Bryan David Haynes, Cumming, GA (US); Matthew Boyd Lake, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 176 days.

(21) Appl. No.: 10/301,122

(22) Filed: Nov. 21, 2002

(65) Prior Publication Data
US 2004/0102122 A1    May 27, 2004

(51) Int. Cl.
*B32B 5/26* (2006.01)
*B32B 27/12* (2006.01)
*D04H 3/02* (2006.01)
*D04H 3/16* (2006.01)

(52) U.S. Cl. .................. 264/465; 28/102; 156/167; 156/181; 264/103; 264/211.12

(58) Field of Classification Search .............. 264/103, 264/211.12, 465; 156/167, 181; 28/102
See application file for complete search history.

(56) References Cited

U.S. PATENT DOCUMENTS

| | | |
|---|---|---|
| 2,736,676 A | 2/1956 | Frickert, Jr. |
| 3,293,718 A | 12/1966 | Sheets |
| 3,341,394 A | 9/1967 | Kinney |
| 3,502,763 A | 3/1970 | Hartmann |
| 3,772,739 A | 11/1973 | Lovgren |
| 3,802,817 A | 4/1974 | Matsuki et al. |
| 3,806,289 A | 4/1974 | Schwartz |
| 3,812,553 A | 5/1974 | Marshall et al. |
| 3,849,241 A | 11/1974 | Butin et al. |
| 3,855,046 A | 12/1974 | Hansen et al. |
| 3,923,587 A | 12/1975 | Porte |
| D239,566 S | 4/1976 | Vogt |
| 4,041,203 A | 8/1977 | Brock et al. |
| 4,095,007 A | 6/1978 | Marshall |
| 4,228,123 A | 10/1980 | Marshall |
| 4,275,105 A | 6/1981 | Boyd et al. |
| 4,276,681 A | 7/1981 | Marshall |
| 4,287,251 A | 9/1981 | King et al. |
| 4,307,143 A | 12/1981 | Meitner |

(Continued)

FOREIGN PATENT DOCUMENTS

EP        0330709 B1    12/1993

(Continued)

OTHER PUBLICATIONS

American Society for Testing Materials (ASTM) Designation: D 5034-90, "Standard Test Method for Breaking Force and Elongation of Textile Fabrics", Jan. 1990, pp. 725-731.

(Continued)

*Primary Examiner*—Leo B. Tentoni
(74) *Attorney, Agent, or Firm*—Robert A. Ambrose

(57) ABSTRACT

The present invention provides continuous fiber nonwoven webs with high material formation uniformity and MD-to-CD balance of fiber directionality and material properties, as measured by a MD:CD tensile ratio of 1.2 or less, and desirably of about 1.0 or less, and laminates of the nonwoven webs. The invention also includes a method for forming the nonwoven webs wherein the fiber production apparatus is oriented at an angle less than 90 degrees to the MD direction and the fibers are subjected to deflection by a deflector oriented at an angle B with respect to the centerline of the fiber production apparatus where B is about 10 to about 80 degrees.

13 Claims, 4 Drawing Sheets

U.S. PATENT DOCUMENTS

| | | |
|---|---|---|
| 4,340,563 A | 7/1982 | Appel et al. |
| 4,405,297 A | 9/1983 | Appel et al. |
| 4,451,589 A | 5/1984 | Morman et al. |
| 4,656,081 A | 4/1987 | Ando et al. |
| 4,707,398 A | 11/1987 | Boggs |
| 4,805,269 A | 2/1989 | Lasenga |
| 4,961,415 A | 10/1990 | Radwanski et al. |
| 4,991,264 A | 2/1991 | Greenway et al. |
| 4,999,080 A | 3/1991 | Boich |
| 5,064,802 A | 11/1991 | Stevens et al. |
| 5,073,436 A | 12/1991 | Antonacci et al. |
| 5,108,820 A | 4/1992 | Kaneko et al. |
| 5,108,827 A | 4/1992 | Gessner |
| 5,149,576 A | 9/1992 | Potts et al. |
| 5,153,157 A | 10/1992 | Hlatky et al. |
| 5,178,931 A | 1/1993 | Perkins et al. |
| 5,204,429 A | 4/1993 | Kaminsky et al. |
| 5,213,881 A | 5/1993 | Timmons et al. |
| 5,244,724 A | 9/1993 | Antonacci et al. |
| 5,272,236 A | 12/1993 | Lai et al. |
| 5,278,272 A | 1/1994 | Lai et al. |
| 5,336,552 A | 8/1994 | Strack et al. |
| 5,366,793 A | 11/1994 | Fitts, Jr. et al. |
| 5,374,696 A | 12/1994 | Rosen et al. |
| 5,382,400 A | 1/1995 | Pike et al. |
| 5,451,450 A | 9/1995 | Erderly et al. |
| 5,482,765 A | 1/1996 | Bradley et al. |
| 5,484,645 A | 1/1996 | Lickfield et al. |
| 5,539,124 A | 7/1996 | Etherton et al. |
| 5,554,775 A | 9/1996 | Krishnamurti et al. |
| 5,707,468 A | 1/1998 | Arnold et al. |
| 5,736,465 A | 4/1998 | Stahl et al. |
| 5,853,628 A | 12/1998 | Varona |
| 5,883,026 A | 3/1999 | Reader et al. |
| 5,968,557 A | 10/1999 | Weger et al. |
| 5,985,775 A | 11/1999 | Deeb et al. |
| 5,989,004 A | 11/1999 | Cook |
| 5,993,943 A | 11/1999 | Bodaghi et al. |
| 6,001,303 A | 12/1999 | Haynes et al. |
| 6,037,281 A | 3/2000 | Mathis et al. |
| 6,048,806 A | 4/2000 | Deeb et al. |
| 6,080,466 A | 6/2000 | Yoshimura et al. |
| 6,133,166 A | 10/2000 | Nissing et al. |
| 6,159,882 A | 12/2000 | Kean et al. |
| 6,177,370 B1 | 1/2001 | Skoog et al. |
| 6,224,977 B1 | 5/2001 | Kobylivker et al. |
| 6,709,623 B2 * | 3/2004 | Haynes et al. ............ 264/465 |

FOREIGN PATENT DOCUMENTS

| | | |
|---|---|---|
| EP | 0569860 B1 | 7/1997 |
| EP | 0671496 B1 | 4/1999 |
| GB | 1324661 A | 7/1973 |
| WO | 98/51474 A1 | 11/1998 |
| WO | 00/33780 A1 | 6/2000 |
| WO | 01/03802 A1 | 1/2001 |
| WO | 02/52071 A2 | 7/2002 |

OTHER PUBLICATIONS

American Society for Testing Materials (ASTM) Designation: E 96-80, "Standard Test Methods for Water Vapor Transmission of Materials," Feb. 1981, pp. 742-751.

* cited by examiner

PROCESS OF MAKING A NONWOVEN WEB

TECHNICAL FIELD

The present invention is related to a process for forming high quality and highly uniform nonwoven webs, and to nonwoven webs or fabrics made by such a method.

BACKGROUND OF THE INVENTION

Many of the medical care garments and products, protective wear garments, mortuary and veterinary products, and personal care products in use today are partially or wholly constructed of nonwoven web materials. Examples of such products include, but are not limited to, medical and health care products such as surgical drapes, gowns and bandages, protective workwear garments such as coveralls and lab coats, and infant, child and adult personal care absorbent products such as diapers, training pants, swimwear, incontinence garments and pads, sanitary napkins, wipes and the like. For these applications nonwoven fibrous webs provide tactile, comfort and aesthetic properties which can approach those of traditional woven or knitted cloth materials. Nonwoven web materials are also widely utilized as filtration media for both liquid and gas or air filtration applications since they can be formed into a filter mesh of fine fibers having a low average pore size suitable for trapping particulate matter while still having a low pressure drop across the mesh.

Nonwoven web materials have a physical structure of individual fibers or filaments which are interlaid in a generally random manner rather than in a regular, identifiable manner as in knitted or woven fabrics. The fibers may be continuous or discontinuous, and are frequently produced from thermoplastic polymer or copolymer resins from the general classes of polyolefins, polyesters and polyamides, as well as numerous other polymers. Blends of polymers or conjugate multicomponent fibers may also be employed. Nonwoven fibrous webs formed by melt extrusion processes such as spunbonding and meltblowing, and formed by dry-laying processes such as carding or air-laying of staple fibers are well known in the art. In addition, nonwoven fabrics may be used in composite materials in conjunction with other nonwoven layers as in a spunbond/meltblown (SM) and spunbond/meltblown/spunbond (SMS) laminate fabrics, and may also be used in combination with thermoplastic films. Nonwoven fabrics may also be bonded, embossed, treated and/or colored to impart various desired properties, depending on end-use application.

Melt extrusion processes for spinning continuous filament yarns and continuous filaments such as spunbond fibers, and for spinning microfibers such as meltblown fibers, and the associated processes for forming nonwoven webs or fabrics therefrom, are well known in the art. Typically, continuous fiber nonwoven webs such as spunbond nonwoven webs are formed with the fiber extrusion apparatus, such as a spinneret, and fiber attenuating apparatus, such as a fiber draw unit (FDU), oriented in the cross-machine direction or "CD". That is, the apparatus is oriented at a 90 degree angle to the direction of web production. The direction of nonwoven web production is known as the "machine direction" or "MD". Also, melt extrusion processes as are known in the art for spinning microfibers and making microfiber webs, such as meltblown webs, are generally oriented with the microfiber extrusion apparatus oriented at a 90 degree angle to the direction of web production. Although the fibers are laid on the forming surface in a generally random manner, still, because the fibers generally exit the CD oriented spinneret and FDU in a direction substantially parallel to the MD, the resulting nonwoven webs have an overall average fiber directionality wherein more of the fibers are oriented in the MD than in the CD. Such properties as material tensile strength and web extensibility, for example, are strongly affected by fiber orientation. For example, typical MD:CD tensile strength ratios for continuous fiber nonwoven webs such as spunbond nonwoven webs are generally higher than 1.5:1 and typically 2:1, or even higher. Therefore, it has been difficult to produce nonwoven webs wherein the properties of the material are balanced with respect to the MD and CD material directions.

Consequently, there remains a need for a production process that provides nonwoven webs with improved balance of material properties and of higher overall uniformity than heretofore known.

SUMMARY OF THE INVENTION

The present invention provides nonwoven webs with high overall uniformity of material formation and MD-to-CD balance of fiber directionality, and MD-to-CD balance of material properties. In one aspect of the invention, the nonwoven webs have a MD-to-CD balance of fiber directionality and material properties as measured by a MD:CD tensile ratio of 1.2 or less, and desirably of about 1.0 or less. In another aspect of the invention, where the end-use application makes it desirable for the nonwoven web to have greater fiber directionality (and thus tensile strength) in the CD than in the MD, the nonwoven webs desirably have a MD:CD tensile ratio of less than 1.0, and more desirably a MD:CD tensile ratio of less than 0.9. The invention also provides for nonwoven laminate materials wherein the uniform nonwoven webs are laminated to one or more additional layers such as for example a layer of barrier material. The webs may desirably comprise olefin polymers and may also desirably comprise additive treatments.

The present invention also provides a method for forming highly uniform, property-balanced nonwoven webs wherein the source of continuous fibers, that is the fiber production apparatus such as extrusion and/or drawing equipment, is oriented at an angle with respect to the direction of web production or MD direction of A (or negative A) which is less than about 90 degrees, and the fibers prior to being laid on the forming surface are subjected to deflection by a deflector oriented at an angle B with respect to the centerline of the fiber production apparatus, where angle B is about 10 degrees to about 80 degrees, and the fibers are collected on a moving surface to form the web. Desirably, A will be from about 30 to about 60 degrees, and may be about 45 degrees. The deflector may for example be a physical deflection device such as a segmented or "toothed" deflection device wherein the segments or "teeth" of the deflection device are oriented at an angle B. Where the deflector is a segmented or "toothed" mechanical deflector the segments or teeth of the device are positioned in the fiber stream. Desirably, B may be about 30 to about 60 degrees. In addition, the fibers may desirably be subjected to electrostatic charging prior to being formed into a nonwoven web.

Further provided is a process for producing multi-layer nonwoven webs including the steps of providing first and second sources of continuous fibers wherein the first source is oriented at an angle A and the second source oriented at about negative A, both with respect to the MD direction, deflecting the fibers with first and second deflectors, the first deflector oriented at an angle with respect to the first source of B and the second deflector oriented with respect to the second source at negative B, where B is about 10 to about 80 degrees, then collecting the fibers from the first and second fiber sources on a moving forming surface to form the multi-layer nonwoven web.

DEFINITIONS

Figure 1A:
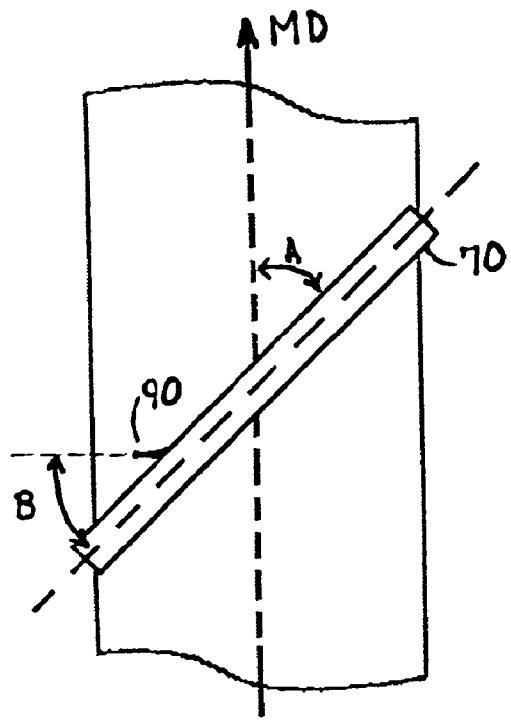
FIG. 1A is an overhead or top plan view illustrating exemplary orientation with respect to the direction of web production or MD for the fiber production apparatus, and exemplary orientation for the deflector with respect to the fiber production apparatus.

As used herein and in the claims, the term "comprising" is inclusive or open-ended and does not exclude additional unrecited elements, compositional components, or method steps.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

As used herein the term "fibers" refers to both staple length fibers and continuous fibers, unless otherwise indicated.

As used herein the term "monocomponent" fiber refers to a fiber formed from one or more extruders using only one polymer. This is not meant to exclude fibers formed from one polymer to which small amounts of additives have been added for color, anti-static properties, lubrication, hydrophilicity, etc. These additives, e.g. titanium dioxide for color, are generally present in an amount less than 5 weight percent and more typically about 2 weight percent.

As used herein the term "multicomponent fibers" refers to fibers which have been formed from at least two component polymers, or the same polymer with different properties or additives, extruded from separate extruders but spun together to form one fiber. Multicomponent fibers are also sometimes referred to as conjugate fibers or bicomponent fibers. The polymers are arranged in substantially constantly positioned distinct zones across the cross-section of the multicomponent fibers and extend continuously along the length of the multicomponent fibers. The configuration of such a multicomponent fiber may be, for example, a sheath/core arrangement wherein one polymer is surrounded by another, or may be a side by side arrangement, an "islands-in-the-sea" arrangement, or arranged as pie-wedge shapes or as stripes on a round, oval, or rectangular cross-section fiber. Multicomponent fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein the term "nonwoven web" or "nonwoven material" means a web having a structure of individual fibers or filaments which are interlaid, but not in an identifiable manner as in a knitted or woven fabric. Nonwoven webs have been formed from many processes such as for example, meltblowing processes, spunbonding processes, air-laying processes and carded web processes. The basis weight of nonwoven fabrics is usually expressed in grams per square meter (gsm) or ounces of material per square yard (osy) and the fiber diameters useful are usually expressed in microns. (Note that to convert from osy to gsm, multiply osy by 33.91).

The term "spunbond" or "spunbond nonwoven web" refers to a nonwoven fiber or filament material of small diameter fibers that are formed by extruding molten thermoplastic polymer as fibers from a plurality of capillaries of a spinneret. The extruded fibers are cooled while being drawn by an eductive or other well known drawing mechanism. The drawn fibers are deposited or laid onto a forming surface in a generally random manner to form a loosely entangled fiber web, and then the laid fiber web is subjected to a bonding process to impart physical integrity and dimensional stability. The production of spunbond fabrics is disclosed, for example, in U.S. Pat. Nos. 4,340,563 to Appel et al., 3,802,817 to Matsuki et al. Typically, spunbond fibers or filaments have a weight-per-unit-length in excess of 2 denier and up to about 6 denier or higher, although finer spunbond fibers can be produced. In terms of fiber diameter, spunbond fibers generally have an average diameter of larger than 7 microns, and more particularly between about 10 and about 25 microns.

As used herein the term "meltblown fibers" means fibers or microfibers formed by extruding a molten thermoplastic material through a plurality of fine, usually circular, die capillaries as molten threads or fibers into converging high velocity gas (e.g. air) streams which attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin. Meltblown fibers may be continuous or discontinuous, are generally smaller than 10 microns in average diameter and are often smaller than 7 or even 5 microns in average diameter, and are generally tacky when deposited onto a collecting surface.

The term "staple fibers" refers to discontinuous fibers, which typically have an average diameter similar to that of spunbond fibers. Staple fibers may be produced with conventional fiber spinning processes and then cut to a staple length, typically from about 1 inch to about 8 inches. Such staple fibers are subsequently carded or airlaid and thermally or adhesively bonded to form a nonwoven fabric.

As used herein, "thermal point bonding" involves passing a fabric or web of fibers or other sheet layer material to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Other common patterns include a diamond pattern with repeating and slightly offset diamonds and a wire weave pattern looking as the name suggests, e.g. like a window screen. Typically, the percent bonding area varies from around 10% to around 30% of the area of the fabric laminate web. Thermal point bonding imparts integrity to individual layers by bonding fibers within the layer and/or for laminates of multiple layers, point bonding holds the layers together to form a cohesive laminate.

As used herein, the term "hydrophilic" means that the polymeric material has a surface free energy such that the polymeric material is wettable by an aqueous medium, i.e. a liquid medium of which water is a major component. The term "hydrophobic" includes those materials that are not hydrophilic as defined. The phrase "naturally hydrophobic" refers to those materials that are hydrophobic in their chemical composition state without additives or treatments affecting the hydrophobicity. It will be recognized that hydrophobic materials may be treated internally or externally with surfactants and the like to render them hydrophilic.

DETAILED DESCRIPTION OF THE INVENTION

The present invention provides continuous fiber nonwoven webs with high overall uniformity of material formation and MD-to-CD balance of fiber directionality, and MD-to-CD balance of material properties. In one aspect of the invention, the nonwoven webs have a MD-to-CD balance of fiber directionality and material properties as measured by a MD:CD tensile ratio of, desirably, 1.2 or less, and more desirably, of about 1.0. In another aspect of the invention, where the end-use application makes it desirable for the nonwoven web to have greater fiber directionality (and thus tensile strength) in the CD than in the MD, the nonwoven webs desirably have a MD:CD tensile ratio of less than 1.0, and more desirably a MD:CD tensile ratio of less than 0.9. The invention also provides for multi-layer laminates of the nonwoven webs such as spunbond-spunbond laminates and laminates comprising barrier materials such as films and meltspun microfiber layers. Also provided are a process for forming the highly uniform, property-balanced continuous fiber nonwoven webs and a process for forming multi-layer nonwoven webs.

The deflector may for example be a physical deflection device such as a segmented or "toothed" deflection device wherein the teeth of the deflection device are oriented at an angle B with respect to the centerline of the fiber source (the fiber production apparatus such as fiber spinneret and fiber drawing equipment), where angle B is 10 degrees to about 80 degrees, and the "teeth" of the device are positioned in the fiber stream. In addition, the fibers may desirably be subjected to electrostatic charging.

The invention will be more fully described with reference to the Figures. Turning to FIG. 1A, there is illustrated in schematic form a top plan view of an exemplary process which demonstrates the orientation of the source of continuous fibers which is the fiber production apparatus 70 with respect to the MD or direction of material production.

FIG. 1A also shows the orientation of a deflector 90 with respect to the centerline of the fiber production apparatus 70. As shown in FIG. 1A, the direction of production or MD is shown by arrow MD. Using the MD direction as the origin or zero degrees and measuring angles by going clockwise, the fiber production apparatus 70 is oriented at an angle A of less than 90 degrees with respect to the MD direction. Desirably, A is about 30 degrees to about 60 degrees, and A is shown here at approximately A=45 degrees. Deflector 90 is shown as a single segmented mechanical deflector "tooth" for clarity, but as will be recognized by one skilled in the art, numerous teeth would be positioned substantially side by side along the length of the fiber production apparatus. Deflector 90 is oriented at an angle B which angle is measured with respect to the centerline of the fiber production apparatus. Angle B should be from about 10 degrees to about 80 degrees and is desirably about 30 degrees to about 60 degrees. The centerline of the fiber production apparatus is shown here in FIG. 1A as a dashed line, and as can be seen deflector 90 is oriented with respect to the fiber source at approximately B=45 degrees.

Figure 1B:
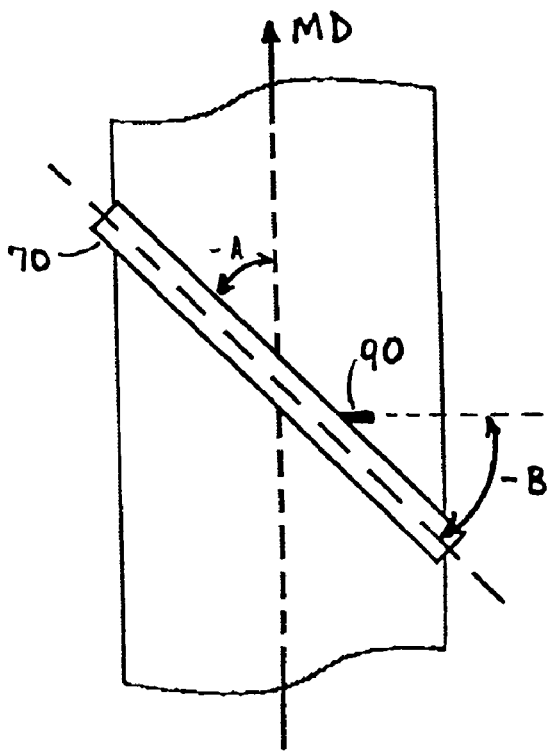
FIG. 1B is a second overhead or top plan view illustrating exemplary orientation with respect to the direction of web production or MD for the fiber production apparatus, and exemplary orientation for the deflector with respect to the fiber production apparatus.

As will be recognized by one skilled in the art, the exemplary process illustrated in FIG. 1A could be reversed for an equivalent process as is illustrated in FIG. 1B, wherein the fiber production apparatus 70 is oriented at an angle of "negative A" with respect to the MD (that is, an angle measured counter-clockwise from the MD) and deflector 90 is oriented at an angle of "negative B" with respect to the centerline of the fiber source or fiber production apparatus (that is, an angle measured counter-clockwise from the centerline of the fiber production apparatus).

Figure 2:
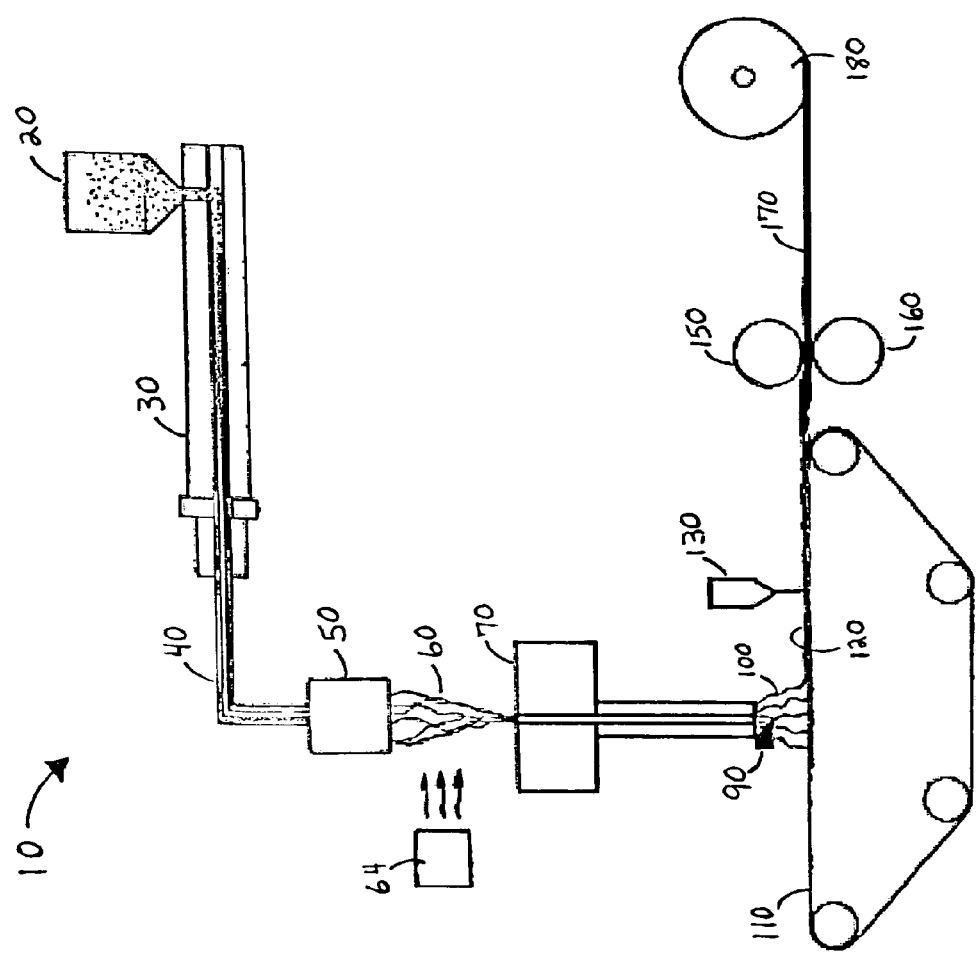
FIG. 2 is a schematic illustration of an exemplary process for producing the highly uniform nonwoven webs of the present invention.

Turning to FIG. 2, an exemplary process for making the nonwoven webs is shown in side view and disclosed in more detail. In reference to FIG. 2, the process line 10 is described with reference to production of monocomponent continuous fibers, but it should be understood that the present invention also encompasses the use of nonwoven webs made with multicomponent fibers (that is, fibers having two or more components).

The process line 10 includes an extruder 30 for melting and extruding polymer fed into the extruder 30 from polymer hopper 20. The polymer is fed from extruder 30 through polymer conduit 40 to a spinneret 50, which (as is shown in FIG. 1, for example) is oriented at an angle A of less than 90 degrees with respect to the MD. Returning to FIG. 2, the spinneret 50 forms fibers 60 which may be monocomponent or multicomponent as described above. Where multicomponent fibers are desired, a second extruder fed from a second polymer hopper would be used. Spinnerets for extruding multicomponent continuous fibers are well known to those of ordinary skill in the art and thus are not described here in detail; however, an exemplary spin pack for producing multicomponent fibers is described in U.S. Pat. No. 5,989,004 to Cook, the entire contents of which are herein incorporated by reference.

Polymers suitable for the present invention include the known polymers suitable for production of nonwoven webs and materials such as for example polyolefins, polyesters, polyamides, polycarbonates and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene; polybutylene, e.g., poly(1-butene) and poly (2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include poly lactide and poly lactic acid polymers as well as polyethylene terephthalate, poly-butylene terephthalate, polytetramethylene terephthalate, polycyclohexylene-1,4-dimethylene terephthalate, and isophthalate copolymers thereof, as well as blends thereof.

The spinneret 50 has openings arranged in one or more rows. The spinneret openings form a downwardly extending curtain of fibers 60 when polymer is extruded through the spinneret. The exemplary process line 10 in FIG. 2 also includes a quench blower 64 positioned adjacent the curtain of fibers 60 extending from the spinneret 50. Air from the quench air blower 64 quenches the fibers 60 extending from the spinneret 50. The quench air can be directed from one side of the fiber curtain as shown in FIG. 2, or both sides of the fiber curtain. As used herein, the term "quench" simply means reducing the temperature of the fibers using a medium that is cooler than the fibers such as using, for example, chilled air streams, ambient temperature air streams, or slightly to moderately heated air streams. The process may desirably further comprise a means (not shown) to carry away fumes produced from the molten polymer such as a vacuum duct mounted above or otherwise near spinneret 50.

A fiber draw unit or aspirator 70 to receive the quenched fibers is positioned below the spinneret 50 and the quench blower 64. Fiber draw unit 70 is oriented at approximately the same angle with respect to the MD as spinneret 50 (that is, at angle A of less than 90 degrees). Fiber draw units or aspirators for use in melt spinning polymers are well known in the art. Suitable fiber draw units for use in the method of the present invention include, for example, linear fiber aspirators of the types shown in U.S. Pat. No. 3,802,817 to Matsuki et al. and U.S. Pat. Nos. 4,340,563 and 4,405,297 to Appel et al., all herein incorporated by reference.

Generally described, the fiber draw unit 70 includes an elongate vertical passage through which the fibers are drawn by aspirating air entering from the sides of the passage and flowing downwardly through the passage. Aspirating air is supplied by a blower (not shown). The aspirating air may be heated or unheated. The aspirating air pulls the fibers through the passage of the fiber draw unit 70 and attenuates the fibers, that is, reduces the diameter of the fibers. Where multicomponent fibers in a crimpable configuration are used and it is desired to activate latent helical crimp in the fibers prior to fiber laydown, the blower supplies heated aspirating air to the fiber draw unit 70. In this respect, the heated aspirating air both attenuates the fibers and activates the latent helical crimp, as is described in U.S. Pat. No. 5,382,400 to Pike et al. When it is desired to activate the latent helical crimp in the fibers at some point following fiber laydown the blower supplies unheated aspirating air to fiber draw unit 70. In this instance, heat to activate the latent crimp may be supplied to the web at some point after fiber laydown.

It may also be desirable to use an electrostatic charging device as an additional control over the distribution of the fibers in the nonwoven web. In this instance an electrostatic charging device such as is known in the art may be placed below the fiber draw unit 70 to impart an electrostatic charge to the fibers as they pass out of the elongate vertical passage of the fiber draw unit. Generally described, an electrostatic charging device consists of one or more rows of electric emitter pins which produce a corona discharge, thereby imparting an electrostatic charge to the fibers, and the fibers, once charged, will tend to repel one another and help prevent groups of individual fibers from clumping or "roping" together. An exemplary process for charging fibers to produce nonwovens with improved fiber distribution is disclosed in co-assigned PCT Pub. No. WO 02/52071 published Jul. 4, 2002.

Figure 4:
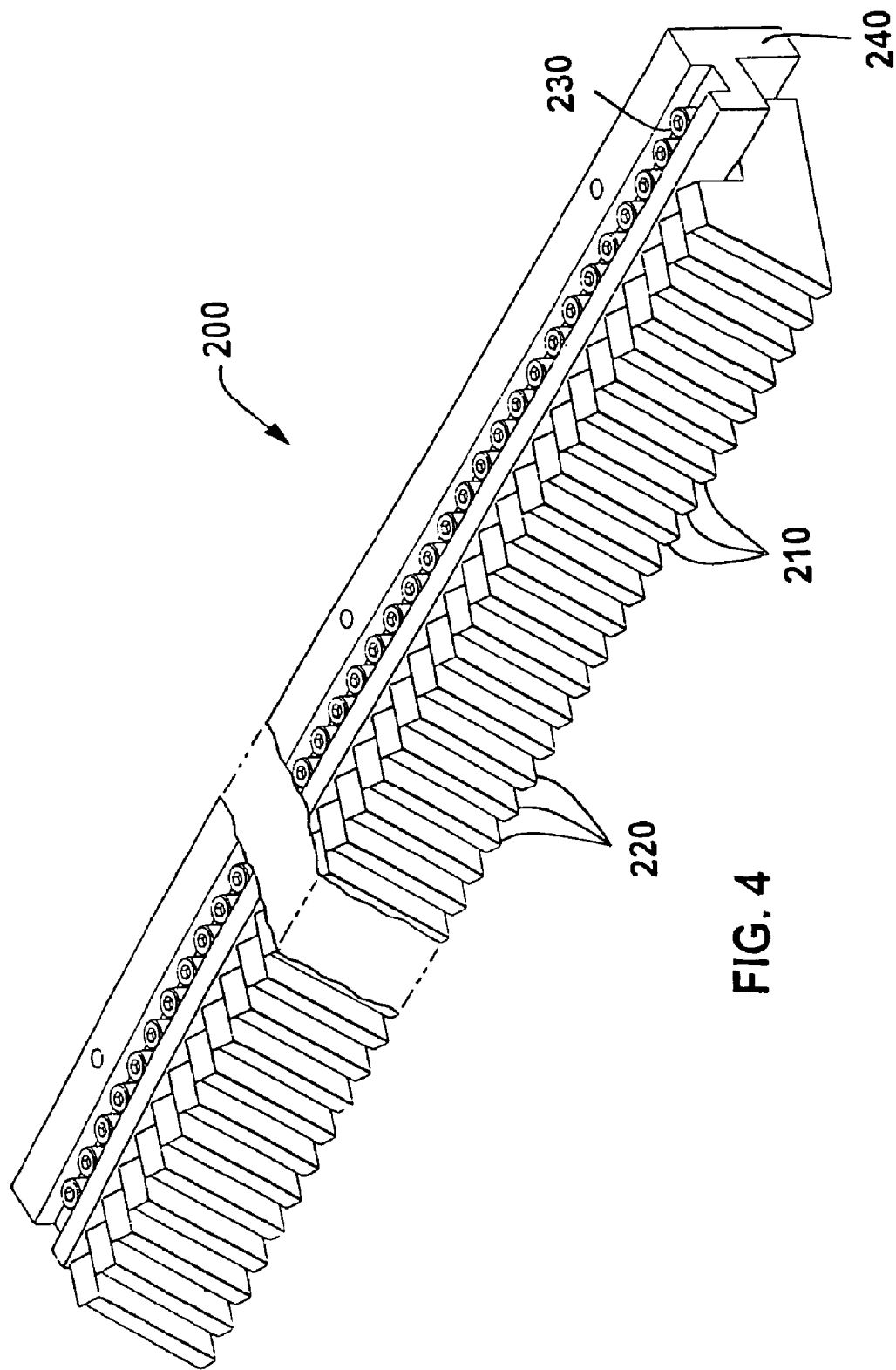
FIG. 4 illustrates in perspective view a segmented mechanical deflection device having spaced-apart segments or "teeth".

Located at the exit of the fiber draw unit 70 is a deflector 90. Deflector 90 may be a segmented mechanical deflector, as is shown generally designated 200 in FIG. 4, segmented by grooves 210 formed by spaced-apart segments or "teeth" 220 mounted by bolts 230 to support 240. Teeth 220 extend into the fiber curtain as the fibers exit the fiber draw unit 70. Teeth 220 may be separated by a spacing of, for example, about 3 millimeters to provide for additional control of fiber distribution. The shape and spacing of the teeth 220 may be varied to produce intended degrees of fiber separation on fiber laydown. Also, teeth 220 can pivot on bolts 230 to be adjustable to a desired angle. It is important that the teeth of the segmented deflector be oriented at an angle B with respect to the centerline of the fiber production apparatus, where angle B is about 10 degrees to about 80 degrees. The deflector may be mounted onto the fiber draw unit or be hung below it or may be mounted to some other portion of the process equipment without being physically mounted to the fiber draw unit.

Also shown in FIG. 2 is endless foraminous forming surface 110 which is positioned below the fiber draw unit 70 to receive the attenuated fibers 100 from the outlet opening of the fiber draw unit 70. A vacuum source (not shown) positioned below the foraminous forming surface 110 may be beneficially employed to pull the attenuated fibers onto foraminous forming surface 110. The fibers received onto foraminous forming surface 110 comprise a nonwoven web of loose continuous fibers 120, which may desirably be initially consolidated using consolidation means 130 to assist in transferring the web to a bonding device. Consolidation means 130 may be a mechanical compaction roll as is known in the art, or may be an air knife blowing heated air onto and through the web as is described in U.S. Pat. No. 5,707,468 to Arnold, et al., incorporated herein by reference.

The process line 10 further includes a bonding device such as the calender rolls 150 and 160 shown in FIG. 2 which may be used to thermally point-bond or spot-bond the nonwoven web as described above. Alternatively, where the fibers are multicomponent fibers having component polymers with differing melting points, through-air bonders such as are well known to those skilled in the art may be advantageously utilized. Generally speaking, a through-air bonder directs a stream of heated air through the web of continuous multicomponent fibers thereby forming interfiber bonds by desirably utilizing heated air having a temperature at or above the polymer melting temperature of the lower melting polymer component and below the melting temperature of higher melting polymer component. As still other alternatives, the web may be bonded by utilizing other means as are known in the art such as for example adhesive bonding means, ultrasonic bonding means, or entanglement means such as hydroentangling or needling.

Lastly, the process line 10 further includes a winding roll 180 for taking up the bonded web 170. While not shown here, various additional potential processing and/or finishing steps known in the art such as web slitting, stretching, treating, or lamination of the nonwoven fabric into a composite with other materials, such as films or other nonwoven layers, may be performed without departing from the spirit and scope of the invention. Examples of web treatments include electret treatment to induce a permanent electrostatic charge in the web, or in the alternative antistatic treatments. Another example of web treatment includes treatment to impart wettability or hydrophilicity to a web comprising hydrophobic thermoplastic material. Wettability treatment additives may be incorporated into the polymer melt as an internal treatment, or may be added topically at some point following fiber or web formation. Still another example of web treatment includes treatment to impart repellency to low surface energy liquids such as alcohols, aldehydes and ketones. Examples of such liquid repellency treatments include fluorocarbon compounds added to the web or fibers of the web either topically or by adding the fluorocarbon compounds internally to the thermoplastic melt from which the fibers are extruded. In addition, as an alternative to taking the nonwoven web up on winding roll 180, the nonwoven web may be directed to various converting or product forming operations without winding.

In certain embodiments, it is highly desirable to have the fiber production apparatus and deflector oriented at respective angles A and B such that the fibers as-produced will exit the fiber production apparatus with less inherent MD orientation than the typically substantially parallel-to-MD fiber orientation which occurs with fiber production apparatus oriented at 90 degrees with respect to the MD, thus producing nonwoven webs with more balanced material properties with respect to the MD and CD material directions. While not wishing to be bound by theory, we believe that selection of angle settings for the fiber production apparatus and deflector as described herein will cause the fibers to be directed more towards the CD than conventional processes (i.e. those having fiber extrusion apparatus oriented at 90 degrees with respect to the MD) and therefore result in an overall average fiber orientation of the web which is less oriented in the MD than conventional webs, which will therefore result in webs with more balanced MD to CD material properties. As one specific example, the fiber production apparatus may be oriented at an angle A with respect to the MD of approximately 45 degrees, and the deflector oriented at an angle B with respect to the centerline of the fiber production apparatus, which should result in the fibers being directed more towards the CD, at least initially as they exit the fiber draw unit, and avoid the situation where the fibers of the web are oriented primarily in the MD.

As another embodiment of the present invention, the highly uniform nonwoven webs may be used in a laminate that contains at least one layer of the highly uniform nonwoven web and at least one additional layer such as a woven fabric layer or an additional nonwoven fabric layer or a film. The additional layer or layers for the laminate may be selected to impart additional and/or complementary properties, such as liquid and/or microbe barrier properties. The laminate structures, consequently, are highly suitable for various uses including various skin-contacting applications, such as protective garments, covers for diapers, adult care products, training pants and sanitary napkins, various drapes, surgical gowns, and the like. The layers of the laminate can be bonded to form a unitary structure by a bonding process known in the art to be suitable for laminate structures, such as a thermal, ultrasonic or adhesive bonding process or mechanical or hydraulic entanglement processes.

As an example, breathable film can be laminated to the nonwoven web to provide a breathable barrier laminate that exhibits a desirable combination of useful properties, such as soft texture, strength and barrier properties. As another example the nonwoven web can be laminated to a non-breathable film to provide a strong, high barrier laminate having a cloth-like texture. These laminate structures provide desirable cloth-like textural properties, improved strength properties and high barrier properties.

Figure 3:
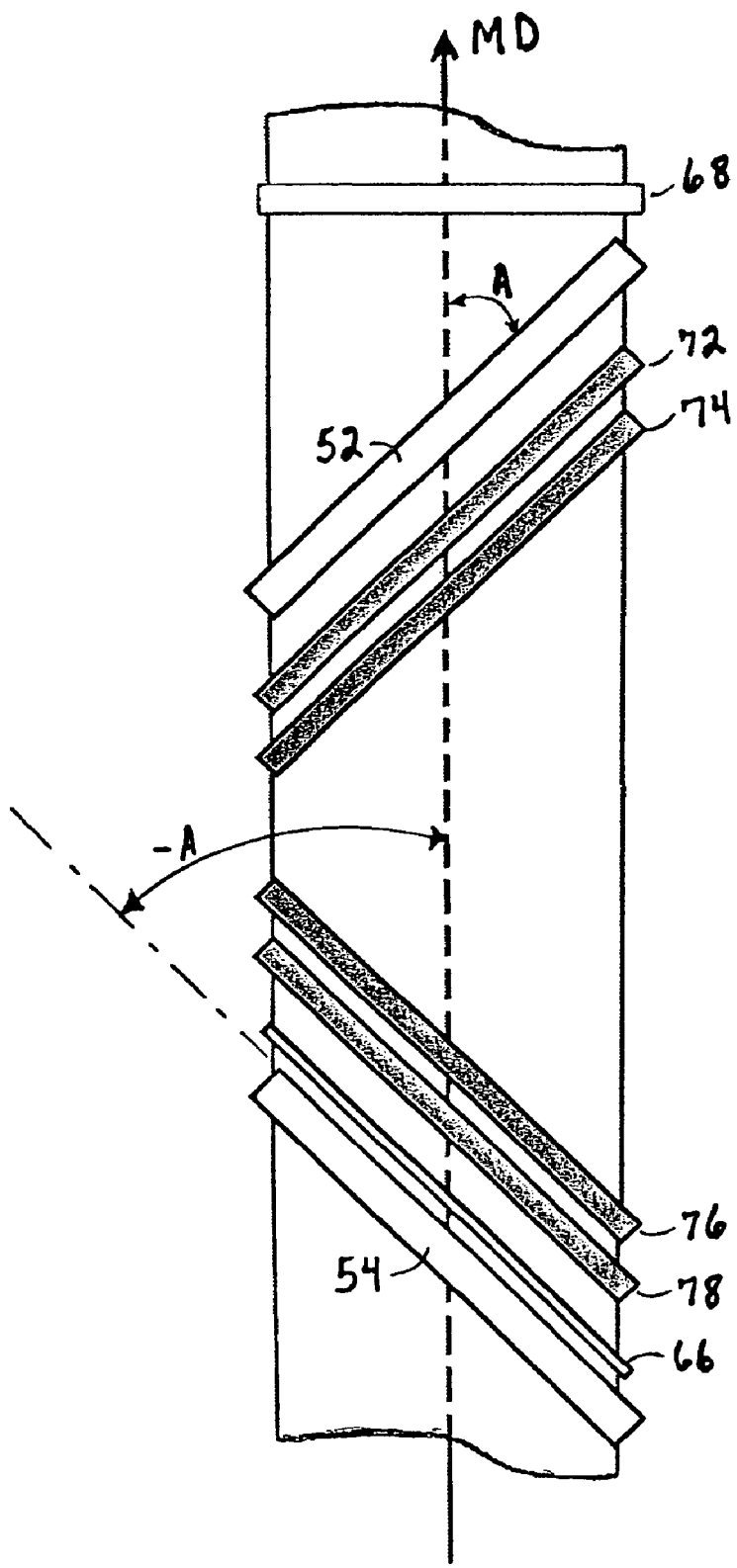
FIG. 3 is a top plan view of another exemplary process for producing the highly uniform nonwoven webs of the present invention as a laminate in combination with meltblown layers.

Another laminate structure highly suitable for the present invention is disclosed in U.S. Pat. No. 4,041,203 to Brock et al., which is herein incorporated in its entirety by reference. FIG. 3 demonstrates in top plan view another exemplary process for making the nonwoven webs of the invention as a laminate structure. In reference to FIG. 3, the process is arranged to produce multi-layer nonwoven webs which are known in the art as for example spunbond-meltblown-spunbond (SMS) nonwoven webs. In FIG. 3 the process includes two banks of continuous fiber spinnerets as first spunbond spinneret 52 and second spunbond spinneret 54, and four banks of meltblown dies 72, 74, 76 and 78 disposed between the first spinneret and second spinneret. First spinneret 52 is oriented at an angle A less than 90 degrees with respect to the MD and as shown here is oriented at approximately 45 degrees with respect to the MD. Although all the fiber extrusion and production equipment could have similar orientation, in the embodiment demonstrated in FIG. 3 second spinneret 54 is oriented at an angle approximately 90 degrees from the angle of first spunbond spinneret 52. That is, second spinneret 54 is oriented at an angle of approximately negative A, as was described with reference to FIG. 1B. Note that these could be reversed, that is, first spinneret 52 could be oriented at negative A with second spinneret 54 oriented at A. Meltblown dies 72 and 74 are shown oriented at approximately the same angle as first spinneret 52, that is, at approximately angle A, while meltblown dies 76 and 78 are oriented at approximately the same angle as second spinneret 54 at approximately negative A. The fiber drawing units (not shown) associated respectively with first spinneret 52 and second spinneret 54 are equipped as described in accordance with FIG. 2 and process line 10. That is, the fiber drawing units of the process shown in FIG. 3 would have fiber deflector as described with regard to FIG. 2, except that for second spinneret 54 and its associated fiber drawing unit the angle of the fiber deflector would be approximately negative B. As described with reference to FIG. 2 and process line 10, an electrostatic charging apparatus may also be utilized where it is desirable to impart additional control over fiber distribution such as to prevent clumping or "roping" of fibers into groups.

Meltblown dies 72, 74, 76 and 78 may be any meltblown dies as are well known to those of ordinary skill in the art and thus will not be described here in detail. Generally described, a meltblown process includes forming fibers by extruding a molten thermoplastic material through a plurality of fine, usually circular, die capillaries as molten threads or fibers into converging high velocity gas (e.g. air) streams which attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin. Meltblown fibers may be continuous or discontinuous, are generally smaller than 10 microns in diameter, and are generally tacky when deposited onto a collecting surface. An exemplary apparatus and process for forming meltblown fibers is described in U.S. Pat. No. 6,001,303 to Haynes et al., herein incorporated in its entirety by reference.

Turning again to FIG. 3, there is shown located between second spinneret 54 and meltblown die 78 a consolidation means 66 such as for example an air knife blowing heated air into and through the web of fibers which is formed from second spinneret 54. Such an air knife is described in U.S. Pat. No. 5,707,468 to Arnold, et al., incorporated herein by reference. Consolidation means 66 acts to initially or preliminarily consolidate the nonwoven web formed from second spinneret 54 to protect it from disruption by the high velocity gas streams at meltblowing processes 72, 74, 76 and 78. Consolidation means 66 may also desirably be a compaction roller as is known in the art. However, where consolidation means 66 is a compaction roller it would typically be oriented at about 90 degrees with respect to the MD rather than as shown in FIG. 3 at an angle parallel to spinneret 54. The process also includes a consolidation means 68 to initially or preliminarily consolidate those portions or layers of the web added subsequent to second spinneret 54. Initial or preliminary consolidation means 68 may desirably be a compaction roll located downstream (later in terms of material process) from first spinneret 52.

Although the process illustrated in FIG. 3 is configured with two banks of spunbond spinnerets and four banks of meltblown dies, it will be appreciated by those skilled in the art that these numbers could be varied without departing from the spirit and scope of the invention. As an example, either fewer or more meltblown die banks could be utilized, or multiple continuous fiber spinnerets may be used in the first or second spinneret positions, or both. In addition, it will be appreciated by those skilled in the art that various other process steps and/or parameters could be varied in numerous respects without departing from the spirit and scope of the invention. For example, some or all of the layers of the nonwoven laminate material may be made individually and separately and wound up on rolls, and then combined into the multilayer nonwoven laminate material as a separate step. Alternatively, the two outer nonwoven layers may be formed at spunbond spinneret banks 52 and 54 as shown in FIG. 3 while a pre-formed barrier layer such as for example a meltblown microfiber layer is unwound between them, instead of using the meltblown die banks 72, 74, 76 and 78. In this regard, it is important to note that the majority of the strength characteristics of the nonwoven laminate material are provided by the continuous fiber facing layers rather than by the barrier material layer, and therefore the barrier layer may be produced from apparatus conventionally oriented at 90 degrees to the MD rather than oriented as shown in FIG. 3. However, orientation of the barrier material production apparatus as shown in FIG. 3 does advantageously provide the same benefits of optionally high production rates or finer fiber production as described below with respect to the continuous fiber webs.

The continuous fiber nonwoven webs and laminate fabrics of the present invention provide a combination of desirable properties such as uniformity of the fabric, uniform fiber coverage, and uniformity of material properties such as tensile strengths and elongation. Furthermore, the present nonwoven web production process is highly advantageous over prior art production processes. Unlike prior art processes for nonwoven webs that inherently orient the fibers of the web disproportionately in the MD or direction of web production, the present process provides continuous fiber nonwoven webs wherein the orientation of fibers is more balanced with respect to the MD and CD. Accordingly, the present process provides continuous fiber nonwoven webs with desirable MD-to-CD balance of strength, elongation, and other properties. In addition, the present process provides for either production of nonwoven webs at very high production rates, or production of finer fiber webs at typical web production rates.

As a specific example of increased rate of production, the spinnerets illustrated in FIG. 1, FIG. 1B and FIG. 3 are shown oriented at angle A (or negative angle A for the second spinneret) which, as shown, is approximately 45 degrees with respect to the MD. Because the hypotenuse of a 45-45-90 triangle is the square root of 2 times the length of a side, these spinnerets are therefore approximately $[2]^{1/2}$ or 1.41 times longer (for the same CD width of material) than spinnerets conventionally oriented at 90 degrees to the MD would be. In this instance the rate of nonwoven web production would be approximately 1.41 times greater than for a process with conventional 90 degree oriented spinnerets, where spinneret capillary spacing and spinneret capillary per-hole polymer extrusion rate are the same for the two processes. Larger or smaller angles A will result in either lower or higher production rates, respectively, than the case for A equal to 45 degrees, but for the same capillary spacing and throughput the rate will always be higher than for a conventional 90 degree oriented process.

As an example of finer fiber webs at typical web production rates, one means known in the art for producing finer fibers is to reduce capillary per-hole extrusion rates. For the specific example wherein the spinnerets are oriented at approximately A equal to 45 degrees as described above the capillary per-hole polymer extrusion rate would be decreased to approximately 71% of (or $[2]^{-1/2}$ times) the per-hole extrusion rate of a conventional process with 90 degree oriented spinnerets, where the nonwoven web production rate and spinneret capillary spacing are the same for the two processes. Therefore with the process of the invention it is possible to reduce per-hole extrusion rate, thus enabling finer fibers, without sacrificing the overall nonwoven web production rates as would be required in a conventional process oriented at 90 degrees with respect to the MD. Finer fibers are often desirable for improved web cloth-like attributes and softness, and improved web layer uniformity and overall strength.

The nonwoven webs of the present invention are highly suitable for various uses, such as for example uses including disposable articles, e.g., protective garments, sterilization wraps, surgical garments, wiper cloths, and liners and covers for absorbent articles.

The following examples are provided for illustration purposes and the invention is not limited thereto.

EXAMPLES

Polypropylene spunbond materials were produced and thermal point bonded and rolled up on a winder as Examples of the nonwoven web material and/or process of the invention. The spunbond web material was produced using fiber production apparatus (i.e., the fiber extrusion and fiber drawing equipment) which was oriented at approximately 45 degrees with respect to the MD direction as is shown in FIG. 1A. The deflector used was a segmented or "toothed" mechanical deflector similar to the segmented deflector shown in FIG. 4, and set with the teeth oriented at approximately 45 degrees with respect to the fiber production apparatus as is shown in FIG. 1A. For certain of the Examples, the fibers were subjected to electrostatic charging at an applied voltage of 15 or 20 kilovolts ("kV") in a manner substantially similar to that disclosed in the hereinabove mentioned publication PCT Pub. No. WO 02/52071.

The spunbond material was produced at basis weights of approximately 20 gsm (Examples E2 and E3) and 40 gsm (Examples E1 and E4), and as a "double pass" of 20 gsm material for a total weight of about 40 gsm (Examples E5 and E6). The "double pass" materials were made by bonding and rolling up a first roll of 20 gsm material, and then inverting and unwinding this previously made material onto the forming surface so that a second 20 gsm web was formed on top of the previously made material, and then the two webs were bonded together as a spunbond-spunbond laminate by thermal point bonding. By "inverting" what is meant is that the surface of the previously formed material which was in contact with the forming surface when the material was formed was facing up on the forming surface for the second pass rather than again facing the forming surface. This was done to simulate the process depicted in FIG. 3 wherein one continuous fiber spinneret is oriented at angle A (approximately 45 degrees) with respect to the MD and the other continuous fiber spinneret is oriented at approximately negative A.

Tensile strength testing was performed as grab tensile strengths in accordance with ASTM D5034-90. Rectangular 100 mm by 150 mm samples to be tested for grab tensile were taken from each of the material samples. In order to assess uniformity of tensile strength the samples were tested in the MD and CD directions; that is, the samples were cut with their long 150 mm axis parallel to either the MD direction or the CD direction. Then, the MD-to-CD tensile strength ratios ("MD:CD") were calculated by dividing the MD tensile result by the CD tensile result. Tensile strength results, material basis weights and electrostatic charging voltage (if applied) are summarized in TABLE 1.

TABLE 1

| Example | Weight (gsm) | Charge (kV) | Tensile MD (kg) | Tensile CD (kg) | MD:CD Ratio |
| --- | --- | --- | --- | --- | --- |
| E1 | 40.7 | 0 | 4368 | 3529 | 1.2 |
| E2 | 20.3 | 15 | 1266 | 1438 | 0.9 |
| E3 | 20.3 | 20 | 1393 | 2209 | 0.6 |
| E4 | 40.7 | 20 | 4078 | 3910 | 1.0 |
| E5 | 40.7 | 0 | 2449 | 1624 | 1.5 |
| E6 | 40.7 | 20 | 2241 | 2585 | 0.9 |

As can be seen in TABLE 1, the continuous fiber webs produced using the process herein described have high uniformity of tensile strengths, generally exhibiting an MD:CD tensile strength ratio of about 1.5 or less, and often 1.2 or less or even as low as about 1.0 or lower.

Numerous other patents have been referred to in the specification and to the extent there is any conflict or discrepancy between the teachings incorporated by reference and that of the present specification, the present specification shall control. Additionally, while the invention has been described in detail with respect to specific embodiments thereof, it will be apparent to those skilled in the art that various alterations, modifications and/or other changes may be made without departing from the spirit and scope of the present invention. It is therefore intended that all such modifications, alterations and other changes be encompassed by the claims.

What is claimed is:

1. A process for forming a continuous fiber nonwoven web comprising the steps of:
    a) providing a source of continuous fibers, said source being oriented at an angle with respect to the MD direction of about A or about negative A, wherein A is less than about 90 degrees;
    b) deflecting said fibers with a deflector, said deflector being oriented at an angle with respect to the source of continuous fibers of B or negative B, wherein B is about 10 degrees to about 80 degrees; and
    c) collecting said fibers on a moving surface to form the nonwoven web.

2. The process of claim 1 wherein A is about 30 degrees to about 60 degrees and B is about 30 degrees to about 60 degrees.

3. The process of claim 2 further comprising the step of electrostatically charging said fibers prior to the step of collecting said fibers on said moving surface.

4. The process of claim 2 further comprising the step of preliminarily consolidating said formed nonwoven web by a means selected from the group consisting of compaction roll and hot air knife.

5. The process of claim 2 wherein said deflector is a mechanical segmented deflector.

6. The process of claim 5 wherein A is about 45 degrees.

7. A process for forming a multi-layer nonwoven web comprising the steps of:
    a) providing a first source of continuous fibers and a second source of continuous fibers, said first fiber source being oriented at an angle with respect to the MD direction of about A, wherein A is less than about 90 degrees, and said second fiber source being oriented at an angle with respect to the MD direction of about negative A;
    b) deflecting said fibers from said first fiber source with a first deflector, said first deflector being oriented at an angle with respect to the first fiber source of B, wherein B is about 10 degrees to about 80 degrees, and deflecting said fibers from said second fiber source with a second deflector, said second deflector being oriented at an angle with respect to the second fiber source of about negative B; and
    c) collecting said fibers from said first fiber source and said second fiber source on a moving surface to form the multi-layer nonwoven web.

8. The process of claim 7 wherein A is about 30 degrees to about 60 degrees and B is about 30 degrees to about 60 degrees.

9. The process of claim 8 further comprising the step of one source of meltspun microfibers disposed between said first fiber source and said second fiber source.

10. The process of claim 8 further comprising the step of electrostatically charging said fibers prior to the step of collecting said fibers on said moving surface.

11. The process of claim 9 further comprising the step of preliminarily consolidating the formed nonwoven web by means selected from the group consisting of compaction roll and hot air knife.

12. The process of claim 9 wherein said first and second deflectors are mechanical segmented deflectors.

13. The process of claim 12 wherein A is about 45 degrees.

* * * * *